US009514393B2

(12) United States Patent
Zheng et al.

(10) Patent No.: US 9,514,393 B2
(45) Date of Patent: Dec. 6, 2016

(54) PRINT METHOD AND PRINT DEVICE FOR MAKING A BANK CARD

(75) Inventors: Song Zheng, Shenzhen (CN); Jing Gao, Shenzhen (CN)

(73) Assignee: SHENZHEN EMPEROR TECHNOLOGY, CO., LTD., Shenzhen (CN)

( * ) Notice: Subject to any disclaimer, the term of this patent is extended or adjusted under 35 U.S.C. 154(b) by 0 days.

(21) Appl. No.: 14/123,959

(22) PCT Filed: Jun. 28, 2011

(86) PCT No.: PCT/CN2011/076477
§ 371 (c)(1), (2), (4) Date: Dec. 4, 2013

(87) PCT Pub. No.: WO2013/000118
PCT Pub. Date: Jan. 3, 2013

(65) Prior Publication Data
US 2014/0111816 A1 Apr. 24, 2014

(51) Int. Cl.

| | |
|---|---|
| ***G06F 15/00*** | (2006.01) |
| ***G06K 15/02*** | (2006.01) |
| ***G06K 15/10*** | (2006.01) |
| ***B41J 13/12*** | (2006.01) |
| ***B42D 25/00*** | (2014.01) |
| *G06F 3/12* | (2006.01) |

(52) U.S. Cl.
CPC .............. *G06K 15/021* (2013.01); *B41J 13/12* (2013.01); *B42D 25/00* (2014.10); *G06K 15/102* (2013.01)

(58) Field of Classification Search
CPC .. G06K 15/021; G06K 15/102; G06Q 20/355; B41K 3/48; B41J 13/12; B42D 15/10
USPC . 358/1.6, 1.14, 1.15, 1.18; 382/115; 705/56, 58
See application file for complete search history.

(56) References Cited

U.S. PATENT DOCUMENTS

| | | | | |
|---|---|---|---|---|
| 3,861,299 | A | 1/1975 | Drillick | |
| 4,083,302 | A * | 4/1978 | Bello et al. | 101/269 |
| 4,271,012 | A | 6/1981 | LaManna | |
| 6,352,206 | B1 * | 3/2002 | Ashley et al. | 235/475 |
| 2003/0069860 | A1 * | 4/2003 | Berndtsson et al. | 705/400 |

(Continued)

FOREIGN PATENT DOCUMENTS

| | | | |
|---|---|---|---|
| CN | 1412008 | A | 4/2003 |
| WO | 9114583 | A1 | 10/1991 |
| WO | 0055804 | A1 | 9/2000 |

OTHER PUBLICATIONS

International Search Report dated Apr. 5, 2012.

*Primary Examiner* — Gabriel Garcia
(74) *Attorney, Agent, or Firm* — Symbus Law Group, LLC; Clifford D. Hyra

(57) ABSTRACT

A print method for making a bank card is provided, which includes the following steps: S10, determining print times and print designs each time according to the convex words and/or designs to be printed; S20, fixing the bank card to be printed to a print position; S30: printing the bank card to be printed several times according to the print times and print designs each time in order to form the convex words and/or designs on it. A print device is also provided for making a bank card. The print method and print device for making the bank card can print convex words and/or designs on the surface of the bank card cheaply and efficiently.

17 Claims, 6 Drawing Sheets

(56) References Cited

U.S. PATENT DOCUMENTS

| | | | | |
|---|---|---|---|---|
| 2003/0152754 | A1* | 8/2003 | Ito et al. | 428/195.1 |
| 2005/0083395 | A1* | 4/2005 | Kubota et al. | 347/215 |
| 2012/0031978 | A1* | 2/2012 | Hansen et al. | 235/488 |

* cited by examiner

PRINT METHOD AND PRINT DEVICE FOR MAKING A BANK CARD

FIELD OF THE INVENTION

The invention relates to the field of making a card, specifically to a print method and a print device for making a bank card.

BACKGROUND OF THE INVENTION

With the development of society, more and more people use bank cards. Therefore, there have been a variety of bank cards attracting people's attention, such as mini cards, multi-chip cards, a variety of commemorative cards, and so on. However, currently, the surface of the bank card is generally printed with planar graphics or pressed by the traditional mechanical mould pressing embosser to have convex letters and numbers, so as to facilitate the bank card to possess identifiability and for inscription rubbing. Therefore, it is relatively difficult to produce some personalized letters or designs. Furthermore, the original production method has the disadvantages of low speed, loud noise and high cost and may not meet the increasingly aesthetic requirements of people for the bank card.

Therefore, it is needed to provide a print method and a print device for making a bank card to solve the existing problems in the prior art.

SUMMARY OF THE INVENTION

The invention solves the technical problem through the following: As a print method and a print device for making a bank card in the prior art have the disadvantages of slow speed, loud noise and high cost, and may not meet increasingly high aesthetic requirement of people for the bank card, under the premise that the original convex effect and inscription rubbing are guaranteed, the invention provides a print method and a print device for printing the surface of the bank card to form convex words and/or designs, with the advantages of low cost, low noise and high efficiency.

The invention adopts the following technical proposal to solve the technical problem: A print method for making a bank card is constituted, wherein the print method comprises the steps: S10: determining print times and print designs each time according to convex words and/or designs to be printed; S20: fixing the bank card to be printed in the print position; and S30: printing the bank card to be printed several times, according to the print times and the print designs each time, so as to form the convex words and/or designs on the bank card to be printed.

As to the print method for making the bank card in the invention, the print designs each time are the same or different print designs.

As to the print method for making the bank card in the invention, each print design comprises a display design for forming convex and displaying words and/or the design and/or a transparent design for forming the convex.

As to the print method for making the bank card in the invention, the printed method for making the bank card also comprises the step: S25: the bank card to be printed is rendered with a transparent layer, so as to enhance the adhesion between the convex words and/or designs and the surface of the bank card.

As to the print method for making the bank card in the invention, the step of S20 is as follows: a plurality of the bank cards to be printed are fixed to the print position through a movable fixed block; the step of S30 is as follows: printing a plurality of the bank cards to be printed several times, according to the print times and the print designs each time, so as to form the convex words and/or designs on a plurality of the bank cards to be printed.

The invention also relates to a print device for making a bank card, wherein the print device comprises a setting module for determining print times and print design each time according to convex words and/or designs to be printed, a positioning module for fixing the bank card to be printed at a print position and a print module for printing the bank card to be printed several times, according to the print times and the print design each time, so as to form the convex words and/or designs on the bank card to be printed.

As to the print device for making the bank card in the invention, the print designs each time are the same or different print designs.

As to the print device for making the bank card in the invention, each print design comprises a display design for forming convex and displaying words and/or the designs and/or a transparent design for only forming the convex.

As to the print device for making the bank card in the invention, the print device for making the bank card also comprises a rendering module for rendering the bank card to be printed with a transparent layer, so as to enhance the adhesion between the convex words and/or designs and the surface of the bank card.

As to the print device for making the bank card in the invention, the positioning module also comprises a movable positioning module for fixing a plurality of the bank cards to be printed to the print position, wherein the print module is further used for printing a plurality of the bank cards to be printed several times, according to the print times and the print designs each time, so as to form the convex words and/or designs on a plurality of the bank cards to be printed.

A print method and a print device for making a bank card in the invention have the following effects: printing the surface of the bank card to form convex words and/or designs with low cost and high efficiency, eliminating the disadvantages of low speed and high cost of the print method and the print device for making the bank card in the prior art, and meeting the increasingly high aesthetic requirements of people for bank cards.

BRIEF DESCRIPTION OF THE DRAWINGS

With the combination of the drawings and preferred embodiments, the invention is further described in the following drawings.

DETAILED DESCRIPTION

In order that the objective, technical proposal and advantages of the invention are better described, the invention is further described in details with the combination of drawings and embodiments in the following: It shall be understood that the embodiments described herein are merely used for explaining the invention and not used for limiting the invention.

Figure 1:
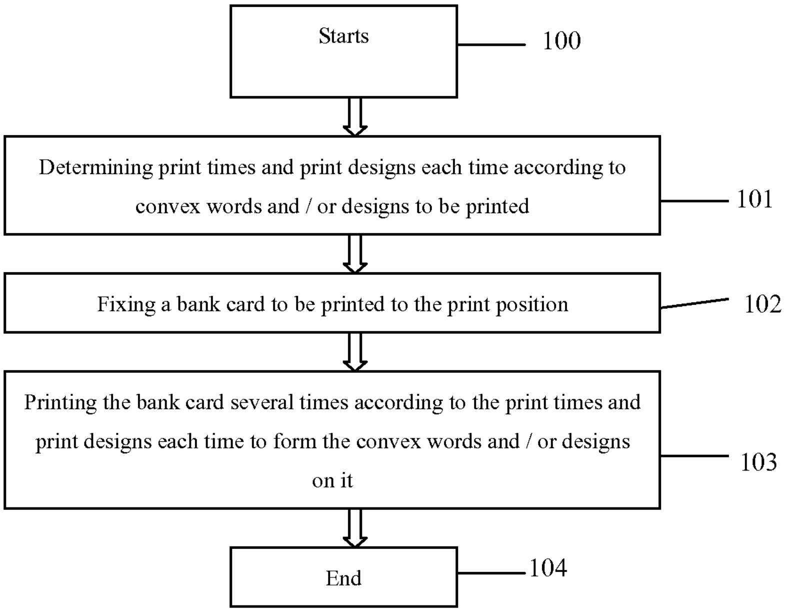
FIG. 1 is a flow chart of a first preferred embodiment of a print method for making a bank card according to the invention.

As to a flow chart of a first preferred embodiment of a print method for making a bank card shown in FIG. 1 in the invention, the print method for making the bank card starts from Step 100 and is implemented subsequently:

Step 101: determining print times and print designs each time according to convex words and/or designs to be printed;

Step 102: fixing the bank card to be printed to the print position;

Step 103: printing the bank card to be printed several times, according to the print times and the print designs each time, so as to form the convex words and/or designs on the bank card to be printed.

The method is eventually ended at Step 104.

The print method for making the bank card in the invention may be adopted to determine the print times and the print designs each time on the surface of the bank card according to convex words and/or designs to be printed. After the bank card to be printed is fixed, the bank card is printed several times, according to the print times and print designs each time. The bank card here may be printed repeatedly so that the individual convexes of letters or words formed on the bank card may be conveniently recognized by the user. The different designs may also be printed each time according to the contents needed to be printed, so that convexes with different thicknesses and forms are formed on different areas of the bank card to achieve better visual effects. Particularly with the use of the latter, 3-D designs (for example, the user's image, corporate logos, etc.) may be printed on the bank card or an identity card to meet relatively high aesthetic requirements of the user for the bank card or the identity card. Therefore, the print method of the invention may achieve embossed display through a plurality of print times while a planar printing may also be realized through a one-time printing.

As the preferred embodiment of the print method for making the bank card in the invention, the print designs each time are the same or different print designs. When convex words or letters are needed to printed on the bank card or the identity card, the same print designs are generally adopted so that the convex designs may be rapidly printed. When convex designs are needed to be printed on the bank card or the identity card, different print designs are generally adopted to form multi-level convex designs on the surface of the bank card or the identity card. Better visual results may be achieved through the changes of convex and concave designs.

As the preferred embodiment of the print method for making the bank card in the invention, each print design comprises a display design for forming the convex and displaying the words and/or designs and/or a transparent design for forming the convex. The print designs of each layer are divided into three kinds: the first print design is the display design for displaying words and/or designs, wherein the display design forms a convex on the surface of the bank card while it forms certain words and/or designs on the surface of the bank card with ink with different colors; the second print design is a transparent design for only forming the convex without displaying any content; and the third print design has not only the display design but also the transparent design in this layer of the printing designs so as to form different designs and convexes in different areas of the bank card. As the print design has diversity, the bank card printed with the print method has more kinds. The display design may be located at the lower layer of all the print designs (that is, the print design closest to the surface of the bank card), so that the display design may be protected from easily falling off with the transparent design. The design or the word with a single color is here more suitable. The display design also may be located at the upper layer of all the print designs (that is, the print design farthest away from the surface of the bank card), so that the color effect of the display design is not changed because of the transparent design. The design or the word with multiple colors is here more suitable. Of course, the display design and the transparent design may also be otherwise matched according to the requirements of the client. However, as long as the bank card or the identity card is printed several times and forms convex words or designs, the words or the designs shall be within the protection scope of the invention.

Figure 2:
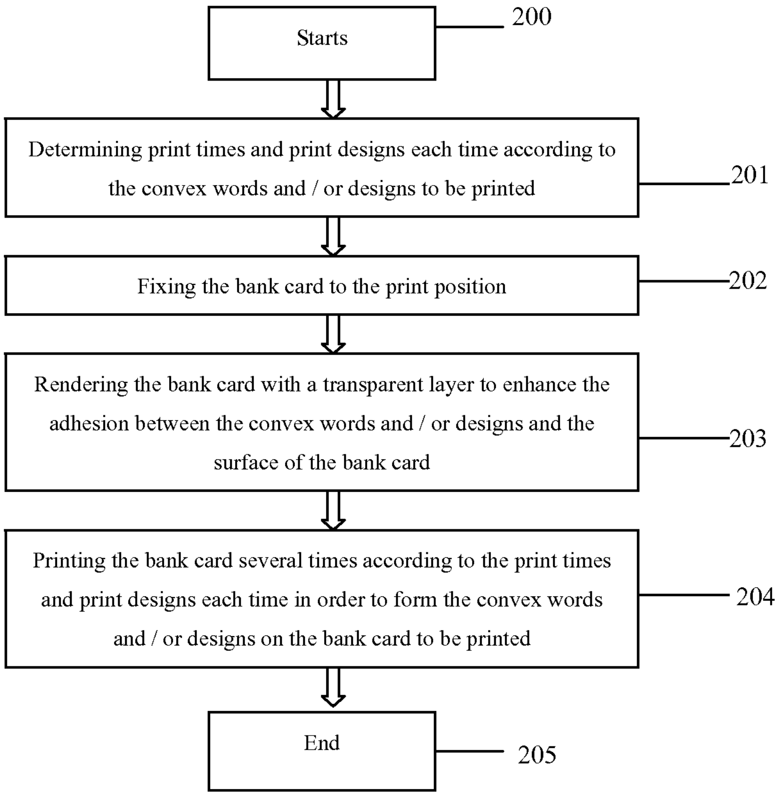
FIG. 2 is a flow chart of a second preferred embodiment of a print method for making a bank card according to the invention.

As to a flow chart of a second preferred embodiment of a print method for making a bank card shown in FIG. 2 in the invention, the print method for making the bank card starts from Step 200 and is implemented subsequently:

Step 201: determining print times and print designs each time according to convex words and/or designs to be printed;

Step 202: fixing the bank card to be printed to the print position;

Step 203: the bank card to be printed is rendered with a transparent layer, so as to enhance the adhesion between the convex words and/or designs and the surface of the bank card; and Step 204: printing the bank card to be printed several times according to the print times and the print designs each time so as to form the convex words and/or designs on the bank card to be printed.

The method is eventually ended at Step 205.

If the print design is directly printed on the surface of the bank card, as the contact area between the print design and the surface of the bank card is relatively small and hence the adhesion is not strong, all the print designs may fall off from the surface of the bank card entirely because of an external force. The surface of the bank card to be printed is rendered with the transparent layer through the print method for making the bank card in the invention (that is, one transparent layer is printed on the entire surface of the bank card), and then the print design is printed on the transparent layer. Therefore, with the expanded area of the transparent layer, the adhesion between the transparent layer and the surface of the bank card is enhanced. At the same time, as the transparent layer and the print design are made of a material with the same compositions, the adhesion between them is also strong. Hence, the print design may be adhered to the bank card more firmly.

Figure 3:
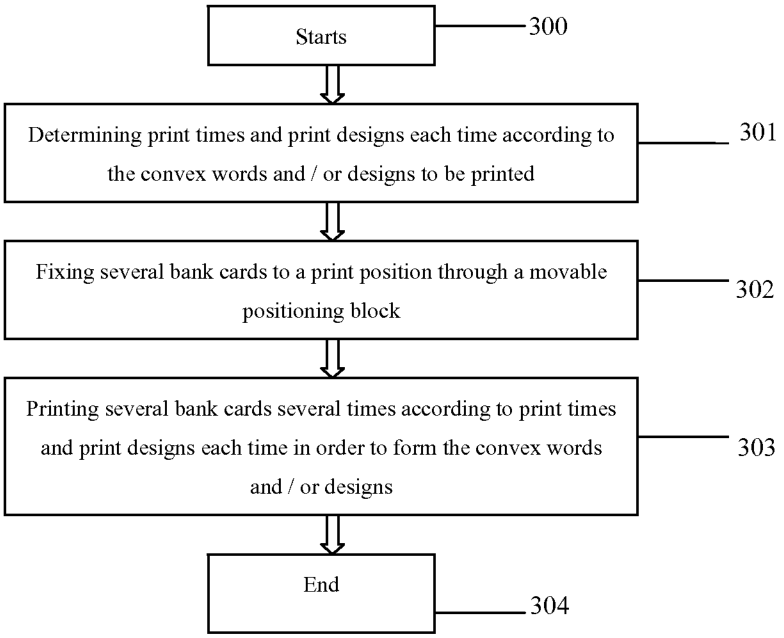
FIG. 3 is a flow chart of a third preferred embodiment of a print method for making a bank card according to the invention.

As to a flow chart of a third preferred embodiment of a print method for making a bank card shown in FIG. 3 in the invention, the print method for making the bank card starts from Step 300 and is implemented subsequently:

Step 301: determining print times and print designs each time according to convex words and/or designs to be printed;

Step 302: several bank cards to be printed are fixed to the print position through a movable fixed block; and Step 303: print the bank cards repeatedly according to the said print times and the print designs each time so as to form the convex words and/or designs on the bank cards to be printed.

The method is eventually ended at Step 304.

Figure 6:
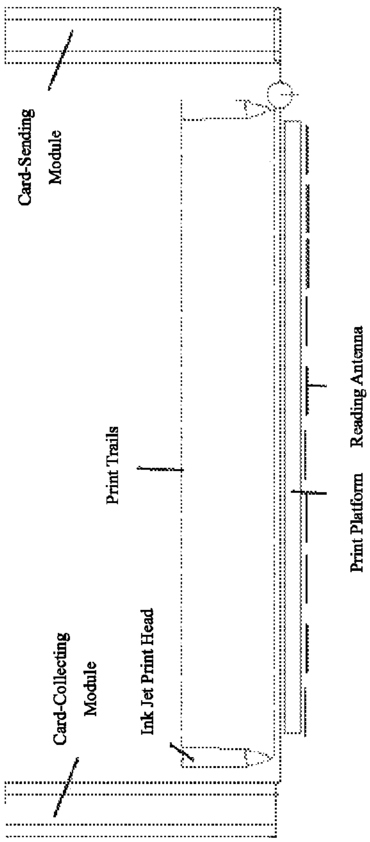
FIG. 6 is a side structural diagram of a preferred embodiment of a print device for making a bank card according to the invention.
Figure 7:
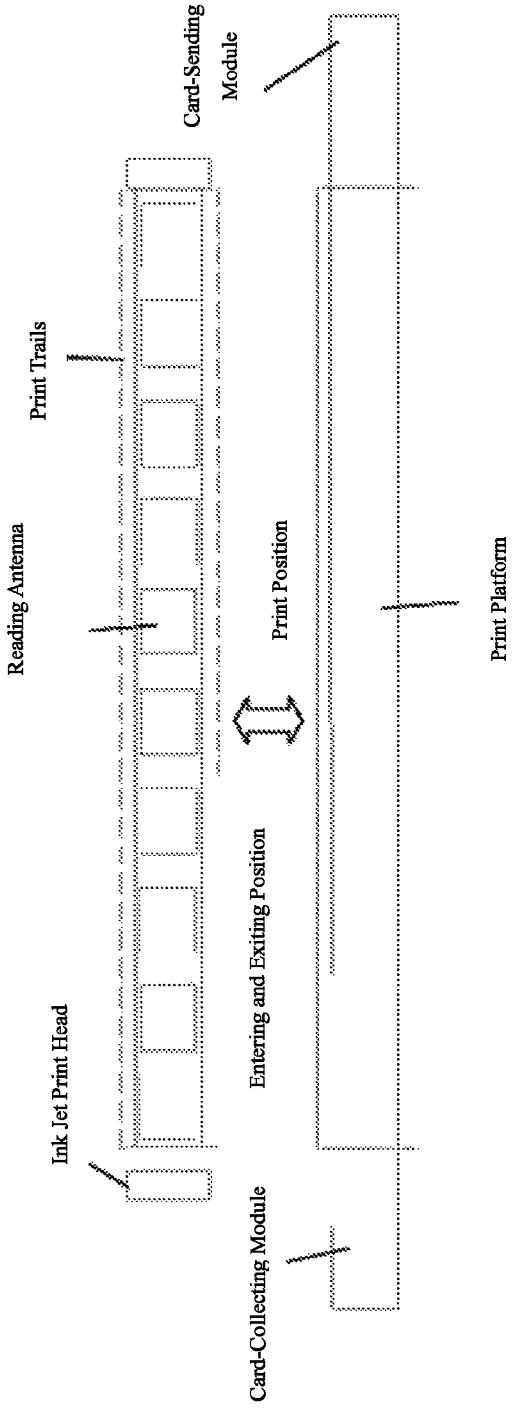
FIG. 7 is a top structural diagram of a preferred embodiment of a print device for making a bank card according to the invention.

A plurality of the bank cards may be printed with the print method for making the bank card at the same time (as shown in FIGS. 6 and 7), to increase the production efficiency of the bank card, thus greatly saving the transport time of inputting or outputting the bank card each time. The bank card is fixed with a movable fixed block so as to fix and print any number of the bank cards.

Figure 4:
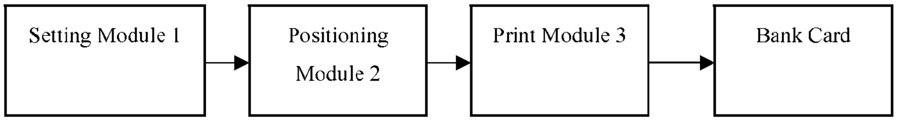
FIG. 4 is a structural diagram of a first preferred embodiment of a print device for making a bank card according to the invention.

The invention also relates to a print device for making a bank card. In a structural diagram of a first preferred embodiment of a print device for making a bank card shown in FIG. 4 according to the invention, the print device comprises a setting module 1, a fixed module 2 and a print module 3, wherein the setting module 1 is used for determining print times and print design each time according to convex words and/or designs; the positioning module 2 is used for fixing the bank card to be printed at a print position; and the print module 3 is used for printing the bank card several times according to the print times and the print design each time so as to form the convex words and/or designs on the bank card to be printed.

With the adoption of the print device for making the bank card in the invention, the setting module 1 may determine the print times and the print designs each time on the surface of the bank card according to convex words and/or designs to be printed. After the bank card is fixed with the setting module 2, the print module 3 may print the bank card several times according to the print times and print designs each time. The bank card here may be printed repeatedly so that the individual convexes of letters or words formed on the bank card may be conveniently recognized by the user. The different designs may also be printed each time according to the content needed to be printed, so that convexes with different thicknesses and forms are formed on different areas of the bank card to achieve better visual effects. Particularly with the use of the latter, 3-D designs (for example, the user's image, corporate logos, etc.) may be printed on the bank card or an identity card to meet relatively high aesthetic requirements of the user for the bank card and the identity card. Therefore, the print device of the invention may achieve embossed display through a plurality of print times while a plane printing may also be realized through a one-time printing.

As the preferred embodiment of the print device for making the bank card in the invention, the print designs each time are the same or different print designs. When convex words or letters are needed to be printed on the bank card or the identity card, the same print designs are generally adopted so that the convex designs may be rapidly printed. When convex designs need to be printed on the bank card or the identity card, different print designs are generally adopted to form multi-level convex designs on the surface of the bank card or the identity card. Better visual results may be achieved through the changes of convex and concave designs.

As the preferred embodiment of the print device for making the bank card in the invention, each print design comprises a display design for forming the convex and displaying the words and/or designs and/or a transparent design for forming the convex. The print designs of each layer are generally divided into three kinds: The first print design is a display design for displaying words and/or designs, wherein the display design forms a convex on the surface of the bank card while it forms certain words and/or designs on the surface of the bank card with an oil ink with different colors; the second print design is a transparent design which is not used for displaying any content but is only used for forming a convex; and the third print design has not only the display design but also the transparent design in this layer of the printing designs so as to form different designs and convexes in different areas of the bank card. As the print design has diversity, the bank card printed with the print method has more kinds. The display design may be located at the lower layer of all the print designs (that is, the print design closest to the surface of the bank card), so that the display design may be protected from easily falling off with the transparent design. The design or the word with a single color is more suitable here. The display design may also be located at the upper layer of all the print designs (that is, the print design farthest away from the surface of the bank card), so that the color effect of the display design is not changed because of the transparent design. The design or the word with multiple colors is more suitable here. Of course, the display design and the transparent design may also be otherwise matched, according to the requirements of the user. However, as long as the bank card or the identity card is printed several times and forms convex words or designs, the words or the designs shall be within the protection scope of the invention.

Figure 5:
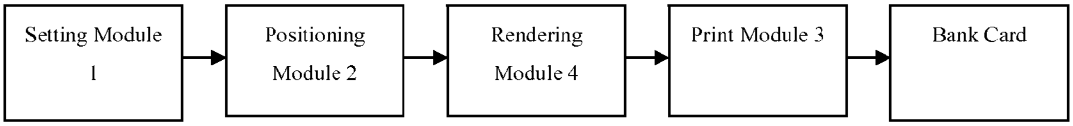
FIG. 5 is a structural diagram of a second preferred embodiment of a print device for making a bank card according to the invention.

In a structural diagram of a second preferred embodiment of a print device for making a bank card shown in FIG. 5 according to the invention, the print device for making the bank card also comprises a rendering module 4, wherein the rendering module 4 is used for rendering the bank card to be printed with a transparent layer, so as to enhance the adhesion between the convex words and/or designs and the surface of the bank card.

If the print design is directly printed on the surface of the bank card, as the contact area between the print design and the surface of the bank card is relatively small and hence the adhesion is not strong, all the print designs may fall off from the surface of the bank card entirely because of an external force. The surface of the bank card to be printed is rendered with the transparent layer through the print method for making the bank card in the invention (that is, one transparent layer is printed on the entire surface of the bank card), and then the print design is printed on the transparent layer. Therefore, with the expanded area of the transparent layer, the adhesion between the transparent layer and the surface of the bank card is enhanced. At the same time, as the transparent layer and the print design are made of material with the same compositions, the adhesion between them is also strong. Hence, the print design may be adhered to the bank card more firmly.

As the preferred embodiment of the printed device for making the bank card in the invention, the positioning module 2 also comprises a movable positioning block. The movable positioning module is used for fixing a plurality of the bank cards to be printed to the print position. The print module 3 is further used for printing the bank cards repeatedly according to the print times and the print designs each time so as to form the convex words and/or designs on the bank cards to be printed.

A plurality of the bank cards may be printed with the print device for making the bank card at the same time (as shown in FIGS. 6 and 7), to increase the production efficiency of the bank card, thus greatly saving the transport time of inputting or outputting the bank card each time. The bank card is fixed with the movable fixed block so as to fix and print any number of the bank cards.

The printed device for making a bank card in the invention is described in the following with a side structural diagram of a preferred embodiment of a print device for making a bank card according to the invention in FIG. 6 and a top structural diagram of a preferred embodiment of a print device for making a bank card according to the invention in FIG. 7.

The print module 3 of the device has a total of ten print positions which may print ten bank cards or identity cards in one time. Ten bank cards to be printed enter into an entering and exiting position from a card-sending module and hence are transported into a print position from the entering and exiting position to be printed. The mutual contact between the cards is fixed. Two sides of the card are fixed using one fixed block and the movable positioning block. After all the cards are fixed on the print position, an ink jet print head prints all the cards along the printing and moving trails repeatedly to form convex words and/or designs. Ten reading and writing antennas are arranged under the device to carry out an electric writing operation for the ten cards at the same time. After the printing and the electrically writing operations are completed, all of the ten cards are returned back to the entering and exiting position and reach a card-collecting module through a transporting platform, thus completing the printing and electric writing processes of the whole bank card. Other types of print heads may also be adopted. However, if the ink jet print head is adopted, better convex printing effect may be achieved more rapidly.

The print method and the print device for making the bank card in the invention may print all personalized information on the front and back sides of the bank card, including an account number, a cardholder name (characters of different languages), a photo, validity, a personal signature and other information. The invention has the advantages of solid and reliable quality, anti-altering, wear resistance and no protective layer, may effectively overcome the disadvantages of loud noise, a complex structure and low productivity caused during the traditional mechanical mold pressing embosser process in the prior art, may effectively overcome the process problems of small antenna size, small reading distance and easy warping of a dual interface IC card, and may be widely applicable for a card-issuing unit of all banks and card manufacturers.

The abovementioned is only examples of the invention and does not hence limit the patent scope of the invention. All the equal structural modifications carried out with the contents in the description and drawings of the invention or other related technical fields utilizing the invention directly or indirectly shall be included in the patent protection scope of the invention similarly.

The invention claimed is:

1. A print method for making a bank card, wherein the print method comprises the following steps:

determining print times and print designs each time according to three-dimensional convex ink words and/or designs to be printed;

fixing the bank card to be printed to the print position; and printing the bank card to be printed several times with ink according to the print times and the print designs each time so as to form the three-dimensional convex ink words and/or designs on the bank card to be printed such that the three-dimensional ink convexes are easily recognizable to a user and have different thicknesses in different areas on the bank card;

wherein the three-dimensional convex ink words and/or designs comprise an embossed display of varying thickness;

wherein the printing the bank card several times comprises printing the bank card with a series of partially overlapping designs to create the embossed display of varying thickness, certain areas of the embossed display being printed more times than others to create greater thicknesses in those areas than the others.

2. The print method for making the bank card according to claim 1, wherein the print designs each time are the same or different.

3. The print method for making the bank card according to claim 1, wherein each print design comprises a display design for forming a convex and displaying the words and/or the designs and/or a transparent design for forming the convex.

4. The print method for making the bank card according to claim 1, wherein the print method for making the bank card also comprises rendering the bank card to be printed with a transparent layer before printing the three-dimensional convex ink words and/or designs, so as to enhance the adhesion between the convex words and/or designs and the surface of the bank card.

5. The print method of claim 4, wherein the transparent layer is printed on the entire surface of the bank card and the convex ink words and/or designs are printed on top of the transparent layer on the bank card.

6. The print method of claim 4, wherein the transparent layer is rendered by printing the transparent layer on the entire surface of the bank card.

7. The print method for making the bank card according to claim 1, wherein the step of fixing the bank card to be printed to the print position comprises fixing a plurality of the bank cards to be printed at a print position through a movable fixed block and printing the bank card to be printed several times comprises printing the bank cards repeatedly according to the print times and the print designs each time so as to form the convex words and/or designs on the bank cards to be printed.

8. The print method of claim 1, wherein the bank card is printed using an ink jet print head.

9. The print method of claim 1, wherein the convex ink words and/or designs comprise all personalized information on the front and back sides of the bank card, including account number, cardholder name and photograph.

10. The print method of claim 1, wherein the printing the bank card several times comprises printing the bank card with a series of completely overlapping designs to create a planar printing having a uniform thickness.

11. The print method of claim 1, wherein the convex ink words and/or designs comprise a lower transparent layer and an upper overlapping colored layer.

12. The print method of claim 1, wherein the convex ink words and/or designs comprise a lower colored layer and an upper overlapping transparent layer.

13. A print device for making a bank card, wherein the print device comprises:

a setting module for determining print times and print designs each time according to three-dimensional convex ink words and/or designs to be printed, a positioning module for fixing the bank card to be printed at a print position, and a print module for printing the bank card to be printed with ink repeatedly according to the print times and the print designs each time so as to form the three-dimensional convex ink words and/or designs on the bank card to be printed such that the three-dimensional ink convexes are easily recognizable to a user and have different thicknesses in different areas on the bank card;

wherein the three-dimensional convex ink words and/or designs comprise an embossed display of varying thickness;

wherein the print module for printing the bank card is configured to print the bank card with a series of partially overlapping designs to create the embossed display of varying thickness, certain areas of the embossed display being printed more times than others to create greater thicknesses in those areas than the others.

14. The print device for making the bank card according to claim 13, wherein the print designs each time are the same or different print designs.

15. The print device for making the bank card according to claim 13, wherein each print design comprises a display design for forming a convex and displaying words and/or the design and/or a transparent design for only forming the convex.

16. The print device for making the bank card according to claim 13, wherein the print device for making the bank card also comprises a rendering module for rendering the bank card to be printed with a transparent layer prior to forming the three-dimensional convex ink words and/or designs, so as to enhance the adhesion between the convex words and/or designs and the surface of the bank card.

17. The print device for making the bank card according to claim 13, wherein the positioning module also comprises a movable positioning module for fixing a plurality of the bank cards to be printed to the print position, wherein the print module is further used for printing the bank cards to be printed repeatedly according to the print times and the print designs each time so as to form the convex words and/or designs on the bank cards to be printed.

* * * * *